United States Patent [19]
Wittgenstein

[11] 3,721,270
[45] March 20, 1973

[54] SAFETY INSTALLATION FOR PREVENTING POLLUTION BY PIPELINES

[76] Inventor: Gerard Francis Wittgenstein, 29 Champrond Way, Lausanne, Switzerland

[22] Filed: Sept. 2, 1970

[21] Appl. No.: 68,949

[30] Foreign Application Priority Data

Sept. 2, 1969   Switzerland..................13849/69

[52] U.S. Cl.................138/104, 73/49.1, 137/312, 138/111, 285/93
[51] Int. Cl..............................................F16l 55/00
[58] Field of Search.......73/40, 40.5 R, 40.5 A, 49.1; 137/236, 312, 558; 138/104, 111, 112, 114; 174/11 R; 285/13, 93; 340/242

[56] References Cited

UNITED STATES PATENTS

| | | | |
|---|---|---|---|
| 3,276,247 | 10/1966 | Bunn | 73/40.5 R |
| 3,336,584 | 8/1967 | Kaiser | 73/40.5 R |
| 3,430,484 | 3/1969 | Wittgenstein | 73/40.5 R |
| 3,473,553 | 10/1969 | Collins | 137/312 |

FOREIGN PATENTS OR APPLICATIONS

| | | | |
|---|---|---|---|
| 1,157,546 | 7/1969 | Great Britain | 73/40.5 R |

Primary Examiner—Houston S. Bell, Jr.
Attorney—Holman & Stern

[57] ABSTRACT

A safety installation for preventing pollution by pipelines, is provided with at least one sector equipped with a jacket of plastic material, the jacket surrounding the pipeline and being sealed at its ends on the latter, with the annular gap formed between the pipeline and its jacket containing a fluid and inserts and spaces. At least one vessel is provided for collecting the evacuated flow and liquid presence detector which gives a warning and remotely controls operations. A fluid-tight hollow space contains a gas under a pressure different from atmospheric pressure and connects the interior of at least one vessel to a crack in the pipe wherever the crack occurs. Instruments permanently monitor the tightness of the space, which comprises at least one perforated gap. Near each vessel is a liquid presence detector and every horizontal run gap of the space is filled with water. The jacket is pierced by at least one perforation, and there is a chimney surrounding the perforation. A channel leads into the chimney above the level of water and leas to a vessel to form part of the space. Every inclined run gap of the space is perforated at a low point in its jacket, and the channel surrounding the perforation and leading to the vessel forms part of the space.

6 Claims, 8 Drawing Figures

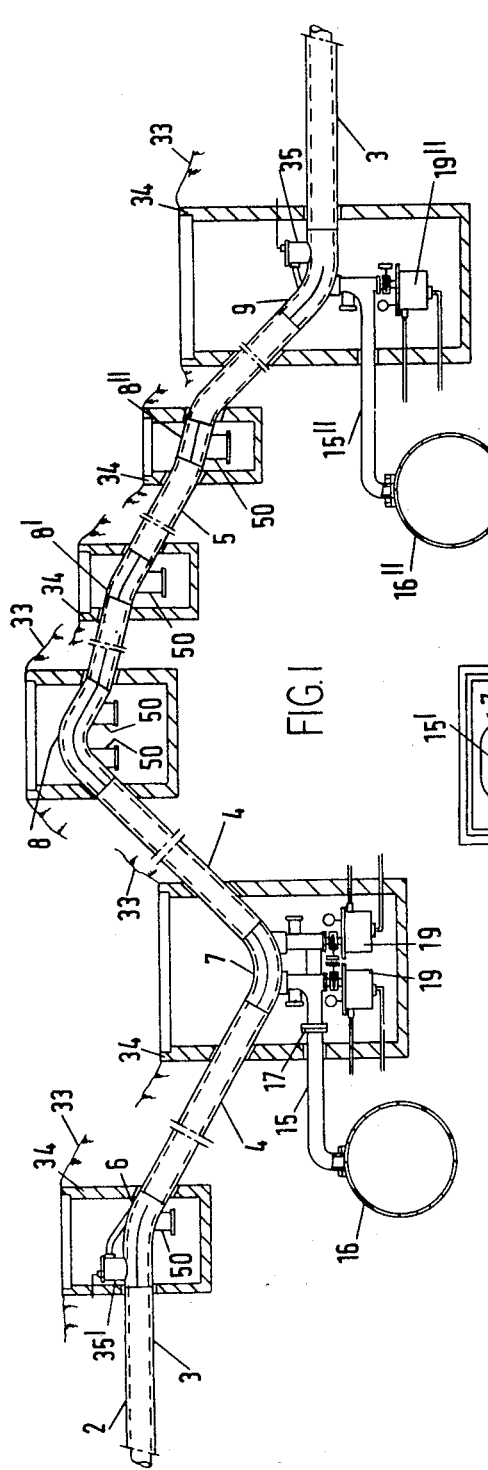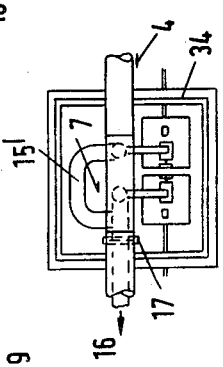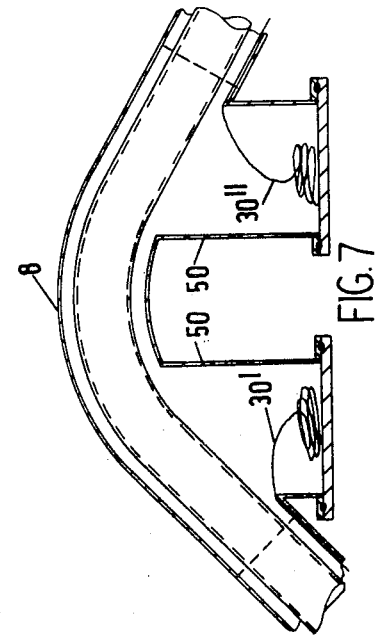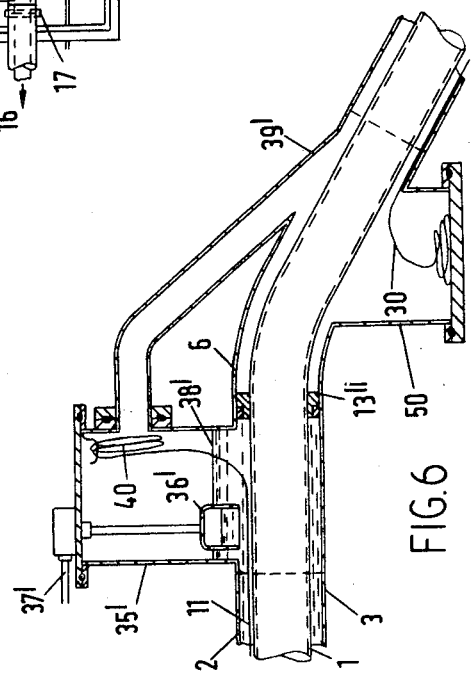

SAFETY INSTALLATION FOR PREVENTING POLLUTION BY PIPELINES

BACKGROUND OF THE INVENTION

This invention relates to a safety installation for preventing pollution by pipelines, particularly those used for transporting liquid hydrocarbons; it is applicable to any pipeline, but particularly to underground or submarine pipelines, whether made of steel, plastic, or any other material.

It may be applied by equipping at least one sector of an existing pipeline or of a pipeline to be built; each equipped sector comprises a fluid-tight jacket of plastic material which surrounds the pipe and which at its ends is sealed on the latter; it is these seals which delimit the sector. The annular space formed between the jacket and the pipe contains a fluid and inserts. The installation also comprises at least one vessel receiving the evacuated flow and a liquid presence detector which gives an alarm and remotely controls operations.

The four essential objects of the invention are to ensure reliable prevention of pollution of the environment due to leakage of a hydrocarbon through cracks in the pipe, to evacuate the leakage flow without delay to a vessel, to signal almost instantaneously the existence of a crack, and finally, as soon as the pipe is cracked, to effect remote control of operations by which the dynamic pressure in the pipe is cancelled; an additional object is to apply the invention not only to underground pipes but also to submerged pipes.

Pollution preventing equipment has already been disclosed for two old types of installation, namely the type having a closed annular gap in which the polluted liquid consequently collects, and the type having an open annular gap which therefore discharges the flow to a vessel. The first type is represented by British Patent No. 886,674 and the second by Swiss Patent No. 468,590.

The accumulator type is inapplicable for various reasons including in particular the fact that a leak may quickly give rise to dangerous pressure in the accumulator gap, thus making it necessary to construct the jacket of a steel material, and this more than doubles the moment of resistance of the pipeline equipped in this manner; the pipeline is thus made very rigid and can no longer bend to adapt itself to the sinuosities of the layout.

The evacuator type known in the present state of the art is applicable only to runs having a high point, which excludes horizontal lengths of the line; in addition, this known type of installation does not provide security. The annular gap is, in fact, in communication with the atmosphere, so that leaking oil flows into the ground through this communication; the lifting of the oil towards a long and expensive discharge manifold changes nothing in this respect, particularly as the tightness of this pipe, which is at atmospheric pressure, is neither controlled nor controllable; moreover, the suitability of this known installation is questionable because the hydrostatic pressure in gradients may attain a dangerous level. Such an installation is expensive because of the counter-measures of dividing gradients which it entails and is therefore inapplicable.

The present invention is intended to overcome all these disadvantages. It eliminates in fact the discharge manifold and also the pressure in gradients and the resulting lack of safety; the connection of the gaps to the atmosphere and the pollution which results therefrom; any lengthening of the path of flow to the vessel and any stagnation on that path; it increases the mean speed of flow; it is applicable to any profile, whether horizontal or a gradient; subsidiarily, it is also applicable at sea and in docks. Consequently, the invention is believed to constitute a remarkable improvement compared with the prior art.

SUMMARY OF THE INVENTION

According to the present invention, the flow of a leakage follows, from the crack to the vessel, a path situated entirely in a leakproof space which is under a different pressure from atmospheric pressure, the tightness of such space being permanently ensured and the space being filled with gas except on horizontal runs, in which it is filled with liquid.

The flow progresses towards the vessel through forced circulation in the liquid runs and through gravity in the other parts of its path.

Such are the functional characteristics of the invention.

The aforesaid forced circulation entails only a low loss of head; moreover, it is sufficient to provide more than one chimney to lower the delivery pressure to the safety threshold of the material of which the jacket is made; this permits the use of inexpensive materials.

It is observed that a gap, whether horizontal or inclined, may be slightly undulating, which does not in any way affect its general classification as horizontal or inclined; a modification or even a reversal of the inclination does not terminate the inclined gap, which is terminated only by a horizontal gap.

An installation according to the invention is characterized in that a fluid-tight hollow space containing a gas under a pressure different from atmospheric pressure connects the interior of at least one vessel to a crank in the pipeline, wherever this crack occurs, in that instruments permanently verify the tightness of said space, in that the latter comprises at least one perforated gap, in that it contains a liquid presence detector situated near each vessel, in that every horizontal gap of said space is filled with water and that its jacket is pierced by at least one perforation, in that the chimney surrounding the perforation and the channel which leads into said chimney above the water level and leads to a vessel form part of said space, in that every inclined gap of said space is perforated at a low point in its jacket, and in that the channel surrounding said perforation and leading to the vessel forms part of said space.

In general, a sector comprises a plurality of gaps; each horizontal gap is connected to the inclined adjacent gap by a selective transfer device which retains static water but permits passage of a flow from the horizontal gap to a vessel.

The selective transfer device consists of the chimney, its channel, and partitioning between the gaps containing different fluids; the channel usually ends either at the adjacent gas-filled gap or at the filling pipe of its vessel; this vessel at the bottom of the gradient is then also used for the flow coming from the horizontal gap; the filling pressures of the water and the gas are then the same.

A special but less advantageous version consists in leading the channel into a vessel which is specific to the horizontal gap; in this case these pressures may be different.

It is observed that it is easier to pressurize the gas slightly than to reduce it below atmospheric pressure.

Instruments such as probes and pressure gauges may, for example, be suitable for permanently verifying or automatically verifying at short intervals the tightness of the fluid-tight space; it is for this reason that the pressures of the water and gas are different from atmospheric pressure.

The water is preferably subjected to demineralization treatment and made non-corrosive and the gas is an inert gas.

Other characteristics will be appreciated from the description which follows.

The jacket is preferably of plastic material and is made in situ, either in the form of two half-shells or in a single piece, which is slit, by the process described in Swiss Patent No. 468,950 of the applicant; it may be advantageous for short jacket elements provided with chimneys, chambers, and perforations to be prefabricated, optionally in two parts.

Inserts, known in themselves from the aforesaid patent, are disposed in the annular gap between the pipe and the jacket; they have the dual purpose of facilitating the centering of the latter and receiving the impact of the jet of liquid escaping through a crack; they form longitudinal channels; it is advantageous for the inserts to have the form of sheets of plastic material or metal, transversely corrugated, by which the pipe is surrounded and which are held in place by straps or by adhesive bonding.

A new improvement of these inserts consists in perforating the flanks of their corrugations; these perforations, which are for example staggered, provide intercommunication between the channels and give rise to passage resistances which absorb the kinetic energy of the flow.

According to the present invention, accessories may be placed in the gaps, particularly metallic elements providing cathodic protection for the pipe against corrosion from the water in the gap, even though it has been demineralized; these accessories, connected by a wire to the pipe, are advantageously disposed between the inserts and the jacket.

Leaks in the pipe may be located by means of locating cables of the type described in Swiss Patent No. 426,394 of the applicant; these cables are to be extracted through access chambers disposed along the sector; if the latter is very long it is convenient to dispose successive cables between two successive chambers or between an access chamber and a chimney.

The electric contacts of these instruments and appliances, such as detectors, probes, contact type pressure-gauges, electrically controlled valves, relays, and so forth, are connected by wires grouped in electric cables to a central panel.

From the central panel the warning is given in the event of a leak, while at the same time operations can be remotely controlled for the purpose of rapidly reducing the dynamic pressure in the pipe; these operations relate particularly to the pumps and valves.

In a special version, the vessel may be isolated by a preferably remotely controlled valve. This arrangement is applied particularly in two cases of operation, namely if the vessel is connected to the open air or when the vessel has to be emptied.

In the case of a submarine pipeline, the vessel is generally submerged.

The two accompanying sheets of drawings illustrate, by way of non-limitative example, some embodiments of the invention.

BRIEF DESCRIPTION OF THE DRAWINGS

FIG. 1 shows diagrammatically, and without the limit seals, a longitudinal view of a pipeline sector; the horizontal and inclined runs, some of which are undulating, that is to say of the type occurring in practice, can be seen therein.

FIG. 6 shows on a larger scale a horizontal gap connected by a selective transfer device to the top of an inclined gap.

FIG. 7 shows on a larger scale the top of the undulation formed by two gradients; there is no horizontal run and therefore no special junction and FIG. 8 is a plan view of the part of FIG. 1 showing the two filling pipes for a single vessel.

DETAILED DESCRIPTION OF THE INVENTION

Figure 2:
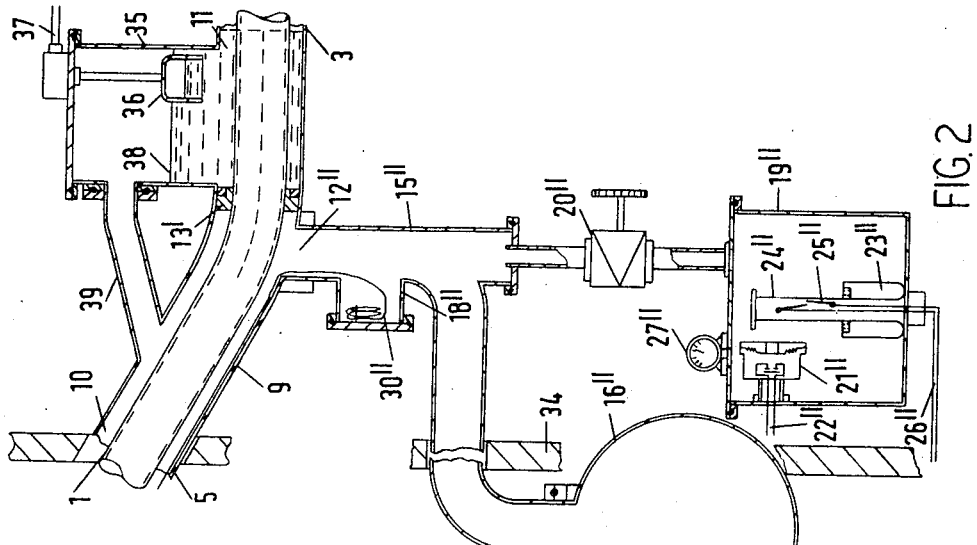
FIG. 2 shows on a larger scale the zone of a perforation at the bottom of an inclined gap connected to a horizontal gap; the filling pipe is connected to the vessel without a valve being inserted, so that in this version the vessel forms part of the controlled fluid-tight space. This figure also shows an example of the selective transfer device, namely the chimney and its channel towards the inclined gap, with this arrangement being mounted in parallel on the partition.

Referring to the drawings, there is shown a pipeline 1 with a jacket 2, horizontal runs 3, inclined runs 4, a V-shaped run 7, and an inclined run 5, which is also undulating. The ground level is shown at 33; several chambers 50 for providing access to the gaps are also shown.

The prefabricated segments 6, 7, 8, 8', 8'', and 9 are preferably disposed in bricked excavations designated 34.

In the drawings, the reference numbers of the runs and segments are accompanied by a line to facilitate reading; for the purpose of simplification, the emptying, drain, and filling valves are not shown in the drawings.

Referring particularly to FIGS. 2, and 8, there is shown an annular gap 11 filled with water around a horizontal run 3, and also a gas-filled gap 10 of the runs 9 and 5 which follow one another, with the first being prefabricated and the second made in situ. The perforation of the jacket of the inclined run is at 12", and filling pipe 15" of vessel 16" feeds box 19" through a detection normally open valve 20" as soon as the flow reaches the perforation. In the path of the filling pipe there is shown a lateral chamber 18", which consequently does not form an obstacle, and which contains one end 30" of a locating cable.

A chimney 35 and a channel 39 branched off from a partition 13' constitute the selective transfer device; the partition in fact prevents the static water from the horizontal run gap from being transferred to the gap 10, while in the case of a leak in the horizontal run of the pipeline, the gap water is immediately forced back and water level 38 rises instantaneously in the chimney; the water is then automatically transferred through channel 39 into the gas gap 10, from which it flows through the action of gravity through the perforation 12" and, following the pipe 15", towards the detection box 19" and the vessel 16". The path of the liquid towards the vessel 16" is defined by the gap 11, the chimney 35, the channel 39, the gap 10, the perforation 12", and the filling pipe 15".

A crack in the inclined pipeline has the effect of filling the same vessel; the selection of the defective run may be effected by a signalling probe situated in the chimney, while another probe, at 36, permanently checks the tightness of the jacket of the horizontal run; in the event of water leakage, the level 38 falls and this probe transmits a signal through a cable 37 to a central panel.

The fluid-tight box 19" contains in particular a device 21" for verifying the pressure of the gaseous fluid; this monitoring means is connected by wires 22" to the central panel; the box also contains a liquid presence detector such as, for example, that represented by a rod 24" on which a float 23" slides. This float contains a magnet which opens or closes a contact 25" connected by electric wires 26" to the panel. A pressure gauge 27", which may be outside the box and even at a distance therefrom, also permits permanent monitoring of gas pressure. The liquid presence detector gives the warning and through its contacts or those of a relay it remotely controls the operations of pumps and valves, which rapidly bring about a drop in the dynamic pressure in the pipeline.

The annular gaps 10 and 11, the channel 39, the chimney 35, the pipe 15", the vessel 16", and the box 19" constitute the controlled space; all this space is placed under the same pressure, which is slightly higher than atmospheric pressure. Theoretically the space could also be subjected to a subatmospheric pressure.

When an oil leak occurs in the run 5 of the pipeline, this oil penetrates into the gap 10, from which it flows by gravity into the vessel 16" after having passed through the perforation 12" and followed the path of the filling pipe 15"; before reaching the vessel 16 it fills the box 19" and operates the float 23". The path of flow of this leakage to the vessel 16" is defined by the gap 10, the perforation 12", and the filling pipe 15".

Figure 5:
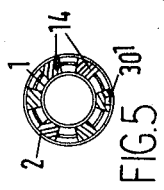
FIG. 5 is a section along the line Y—Y of the pipe shown in FIG. 3.

For the sake of simplification of the drawings, the inserts are not shown in FIG. 2, but they are seen in section in FIG. 5; in the version illustrated by way of example inserts 14 are all connected together, while at 30' there is shown a groove receiving the locating cable. In order not to go beyond the limits of the drawing, the extension of the horizontal run 3 is also not shown; if this run is very long it is equipped at any points along its path with fluid-tight chimneys, each of which leads by way of a simple filling channel to a vessel provided with a liquid presence detector.

The installation is anti-polluting because any oil which leaks out is carried to the vessel, from which it is pumped; moreover, its devices detect any oil leakage without delay and initiate operations by remote control; finally, the tightness of the jacket and more generally of the fluid-tight space is permanently monitored. For these reasons the invention fulfils its aims.

Figure 4:
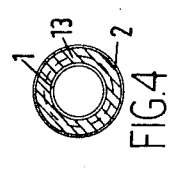
FIG. 4 is a section along the line X—X of the partition shown in FIG. 3.
Figure 3:
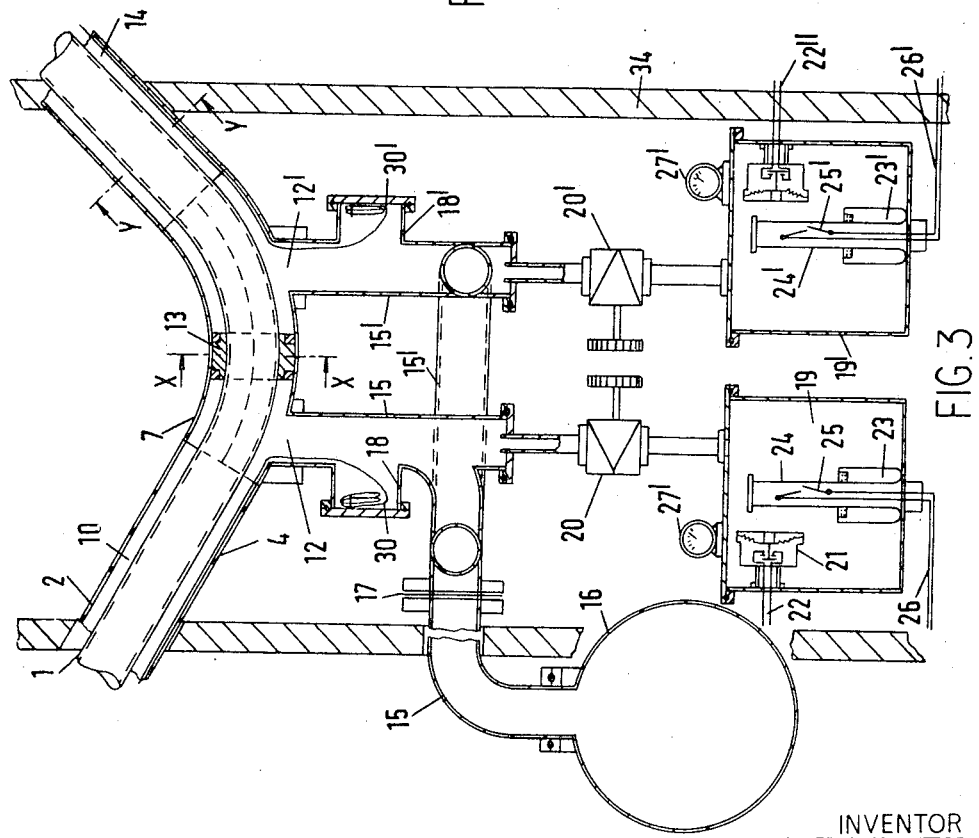
FIG. 3 shows on a larger scale a double perforation at the bottom points of two oppositely inclined runs separated by a partition; in this version a valve is disposed on the pipe filling the vessel, so that the latter can be isolated. It may be observed that in practice it would have been considered that a profile of this kind which has no horizontal run has only a single bottom point; partitioning would therefore not have been effected and a single perforation would be sufficient.

Referring especially to FIGS. 3 and 4, known elements are found once more; the gas-filled gaps 10 and 14 are here separated by a partition 13. Each gap is perforated, one of them at 12 and the other at 12'; the vessel filling pipe 15 receives, upstream of a valve 17, the pipe 15' which cooperates with the gap 14 and the perforation 12'; a detection box 19 and 19' respectively is associated with each pipe. A flow path is constituted by the gap 14, the perforation 12', the pipe 15', and the pipe 15; another flow path is constituted by the gap 10, the perforation 12, and the pipe 15.

In the version provided with a valve, various cases of operation can be considered; for example, the vessel is uncovered, in which case is normally closed and opens only under remote control through the action of a relay operated by one of the probes 24 or 24' as a result of the arrival of liquid. In another mode of operation the vessel is submerged; the valve is then normally open and is closed by remote control only if the vessel is emptied; the valve then isolates the installation.

In FIG. 6 there are found once again the elements known from the description of the previous figures. Ends 30 and 40 of crack locating cables have been rolled into rings to facilitate their affixing. Referring to FIG. 6 at the same time as FIGS. 1 and 3, it is seen that the path of flow towards the vessel 16 is defined by the gap 11, the chimney 35', the channel 39', the gap 10, the perforation 12, and the pipe 15.

Finally, in FIG. 7 known elements are found again.

The invention is advantageously applied, whatever the profile of the layout, in all cases where the law or public welfare require a ban on underground or maritime pollution, since a warning and operations immediately follow a leakage in the pipeline.

What I claim is:

1. In combination, a pipeline and a safety installation for preventing pollution of the pipeline environment through cracks in that pipeline, said combination comprising a pipeline section defining a plurality of runs, a continuous jacket surrounding said pipeline section and sealed at its ends thereto, spacing means having channels therein providing an annular gap between said pipeline section and said jacket along which liquid leaking from said pipeline section can flow, fluid tight partitions dividing said annular gap into horizontal water-filled runs in which the water flows by repelling action of leakage liquid, and inclined adjacent gas-filled runs, in which the liquid flows by gravity, the water and gas in said runs being at the same constant pressure, which slightly exceeds atmospheric pressure, each said gas-filled run having at its lower end a leakage pipe connected to an individual closed collecting vessel situated at a still lower level and also to a detector device which is reactive immediately to liquid in said leakage pipe, said gaps, said leakage pipe and said collecting vessel forming a sealed enclosure, and selective transfer devices acting to by-pass said partitions, each transfer device comprising a chimney partially filled with water of a horizontal run and communicating over said water lever with an inclined run.

2. The safety installation for pipelines as claimed in claim 1 including a short conduit between the chimney and the inclined run providing the communication over the water level with an inclined run, and instruments permanently monitoring the fluid tightness of said enclosure.

3. The safety installation for pipelines as claimed in claim 1 in which the liquid filling the channels of the annular gap of the horizontal run is demineralized water and the gas filling the channels of the annular gap of the inclined run is an inert gas.

4. The safety installation for pipelines as claimed in claim 1 in which the runs contain metallic elements for cathodic protection of the pipeline.

5. The safety installation for pipelines as claimed in claim 1 in which each run is provided with a fluid tight access chamber.

6. The safety installation for pipelines as claimed in claim 1 in which the spacing means are perforated so as to insure communications between the channels.

* * * * *